United States Patent
Boyd

[15] 3,692,238
[45] Sept. 19, 1972

[54] NAVIGATION AID
[72] Inventor: George M. Boyd, 2904 Westover St., Wichita, Kans. 67210
[22] Filed: July 30, 1970
[21] Appl. No.: 59,634

[52] U.S. Cl. ................235/88, 235/61 NV, 35/40, 40/70 R
[51] Int. Cl. ...................................G06c 3/00
[58] Field of Search......235/78, 88, 84, 61 NV, 61 S, 235/61 V; 35/40, 74; 40/70 R

[56] References Cited

UNITED STATES PATENTS

| | | | |
|---|---|---|---|
| 1,546,928 | 7/1925 | Graham | 35/40 |
| 2,506,299 | 5/1950 | Isom | 235/61 S |
| 2,508,894 | 5/1950 | Schloer | 235/88 |
| 3,058,653 | 10/1962 | Des Granges | 235/88 |
| 3,249,085 | 5/1966 | St. Jean | 116/133 |
| 3,262,640 | 7/1966 | Jameson | 235/78 |
| 1,849,379 | 3/1932 | Passek | 40/70 R |

FOREIGN PATENTS OR APPLICATIONS

| | | | |
|---|---|---|---|
| 461,946 | 2/1937 | Great Britain | 35/40 |
| 809,473 | 2/1959 | Great Britain | 40/70 R |
| 85,589 | 2/1936 | Sweden | 35/40 |

Primary Examiner—Richard B. Wilkinson
Assistant Examiner—Stanley A. Wal
Attorney—Phillip A. Rein

[57] ABSTRACT

An air navigational aid device comprising the provision of the latitude and longitude of the air bases listed on the device; a copy of the Morse code; a flight planning diagram for noting location, heading, distance, time, fuel, and/or ETA thereon; a map of a geographic area showing the runway patterns of the air bases, and locating and naming the air bases and restricted zones in the mapped area; a circular time-distance computer for calculating ground speed, flight time, and fuel supply; tables of headings and distances from a selected air base to the other air bases in the area; a statute mile to knot conversion scale; the location of each TACAN facility of each air base; and the elevations and runway headings for each air base; all on a device comprising a large circular disk sandwiched between two smaller disks that are rotatably connected together at their centers.

10 Claims, 5 Drawing Figures

FIG. 3
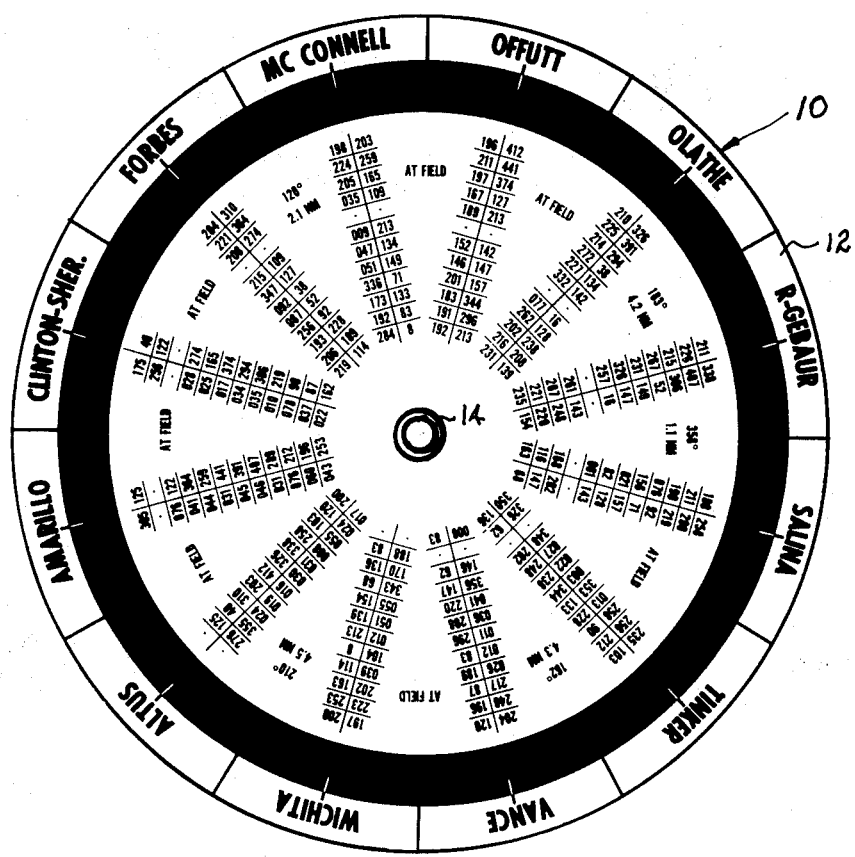
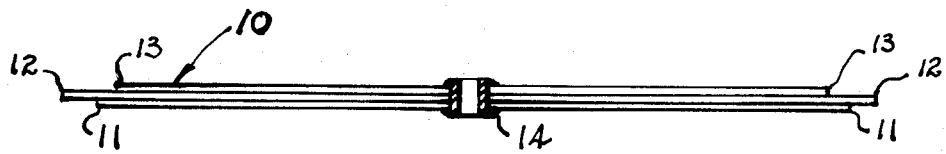
FIG. 4
INVENTOR.
GEORGE M. BOYD
BY Ronald W Mayes

INVENTOR
GEORGE M. BOYD
BY Ronald W Mayes

NAVIGATION AID

BACKGROUND OF THE INVENTION

Heretofore, pilots of aircraft have had difficulty in making rapid inflight changes of destination usually made necessary due to bad weather, dangerous runway conditions, and/or air traffic congestion. A jet aircraft, such as an F-105 in particular, must quickly execute any mission and return to base due to its very limited time in the air. Jet aircraft consume a great quantity of fuel during its flight, and every pound of fuel it must carry operates to reduce its payload. Accordingly, where an air base cannot be used, a jet aircraft must be quickly diverted to an alternate selection. A pilot in this situation does not have the luxury of a time consuming search for alternate air base information and its selection from his map case. The alternate base must be selected quickly and judiciously, after available fuel and flying time has been determined, along with the ground speed of the aircraft.

Although the foregoing military problem is recognized, it is also recognized that there is a need particularly for civilian pilots and/or navigators to obtain the same or similar information either in planning their flights, or in making in-flight changes of destination or course.

SUMMARY OF THE INVENTION

This invention relates to navigation aids. More particularly, this invention relates to air navigational aid devices especially suitable for use in-flight by pilots and navigators.

A principal object of this invention therefore is the provision of a novel air navigation aid device especially suitable for use in-flight by pilots and navigators.

Another object of this invention is the provision of a novel air navigational aid device that permits a rapid determination of the heading and distance to each air base in a given geographical area from a selected air base in the same area.

A further object of this invention is the provision of the novel air navigational aid device set forth in the preceding paragraph having a dialable base selector for viewing from the selected air base, the heading and distance to each of the other air bases in the same geographic area.

A still further object of this invention is the provision of a novel air navigational aid device as set forth in the preceding paragraph comprising a time-distance computer for calculating fuel supply, flight time, and ground speed.

Another object of this invention is the provision of a novel air navigational aid device as set forth in the preceding paragraph listing the latitude and longitude of the air bases, the location of each TACAN facility of each air base, the elevations and runway headings of each air base, the Morse code, and/or providing a flight planning diagram for noting location, heading, distance, time, fuel, and/or ETA thereon.

Yet another object of this invention is the provision of a novel air navigational aid device as set forth in any one of the preceding objects, a map of a geographic area showing the runway patterns of the air bases, and/or locations and names of the air bases and restricted zones in the area.

A further object of this invention is the provision of a novel air navigational aid device comprising, three thin circular disks connected together at their centers for free rotation relative to each other with the middle disk being sandwiched between the front and back disks, in fulfillment of the preceding objects.

Another object of this invention is the provision of the device set forth in the preceding object wherein the middle disk has a greater diameter than the front and back disks, and the front and middle disks cooperate to form a circular time-distance computer while the middle and back disks cooperate to provide heading and distance information from a dialably selected air base to other air bases in the same geographic area.

A further object of this invention is the provision of a novel navigational aid device comprising a dialable base selector for viewing location of the TACAN facility relative to a selected air base, and as set forth in the preceding object.

More particularly, the air navigational aid device of this invention not only provides a miniature map on one side thereof of all of the air bases within preferably 250 miles of a centrally selected air base, but also provides on the other side of the device, a dialable disk for viewing the heading and distance from the nearby air base to all of the air bases in the area shown on the map.

A time-distance computer, provided on the first side of the device, permits a user to calcualte ground speed, fuel supply, and flight time very quickly. Given accurate flying time, ground speed, and fuel supply, the user can adjust an automatic direction finder, ADF, for the closest desired alternate air base and proceed forthwith to the selected alternate air base.

Another useful feature of this invention is the provision of a window on the reverse or back side of the device for viewing the TACAN facility location relative to the field or air base selected by setting the dialable disk. Also on the same back side of the device is listed the latitude and longitude of each air base shown on the map. The elevation and the heading of the runways of the air bases are also shown on the reverse side of the device.

A flight planning chart is also provided on the reverse side of the device for use in noting destination or location, heading, distance, time, fuel, and/or estimated time of arrival, ETA, for each leg of the flight prior to takeoff, or of any in-flight destination changes or course changes.

The front side of the device shows the Morse code, a statute mile to knot conversion scale, the runway patterns for each air base, and the restricted areas not usually to be flown over by civilian and military craft.

More particularly, the runway patterns of the various air bases are preferably very accurately displayed on the map in detail for the benefit of the pilot. This detailed display could operate to save fly-over time in case of a critical fuel shortage situation. It is also beneficial in zero or low visibility weather situations for the proper mental orientation of the pilot or navigator relative to the air base. Moreover, the map is provided with a true north and magnetic north indicator, also for the proper orientation of the map and map reader. However, the intelligence indicia, such as words, numbers, letters, and symbols are orientated in a conventional map reading manner or quick orientation of the map by the user.

This invention further resides in certain novel features of construction, combinations and arrangements of parts, and further objects and advantages of the invention will be apparent to those skilled in the art to which it pertains from the following description of the present preferred embodiment thereof described with reference to the accompanying drawings, which form a part of this specification, and wherein the same reference characters represent corresponding parts throughout the several views, and in which:

FIG. 3 is a plan view of the back side of the device shown in FIG. 2, but with a rotatable selector disk removed to show the distance and heading tables for each of the air bases identified on the perimeter of the selector disk, and the TACAN facility for the air base;

FIG. 4 is a view taken along section line 4—4 of FIG. 2; and

Figure 1:
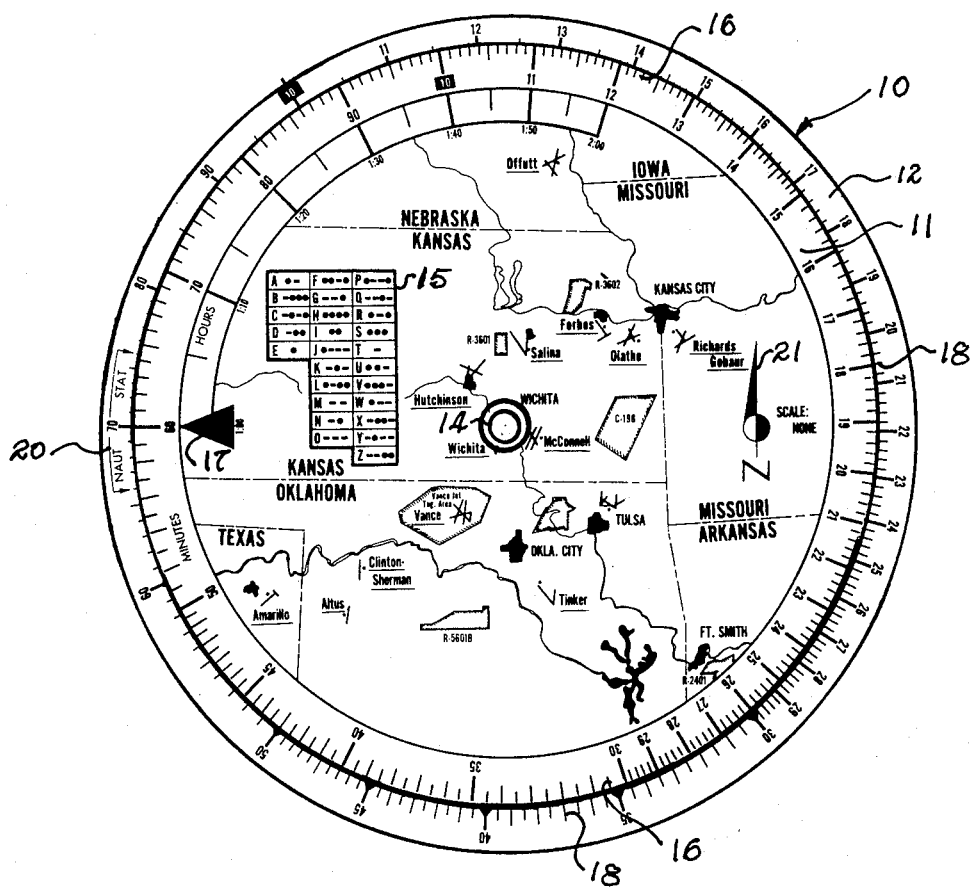
FIG. 1 is a plan view of the front side of a circular air navigational aid device embodying the invention.

It is to be understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to the FIGS. 1 through 4, an air navigational aid device embodying the invention is indicated generally by the reference numeral 10. The device 10 comprises three rotatable circular disks 11, 12, and 13 pivotally connected together at the centers thereof by a centrally located fastening means, such as a cylindrical rivet 14.

The disks 11, 12, and 13 are preferably made of a thin, flexible, lightweight, water repellant cardboard material. However, it would appear that a polymeric material may also serve the purpose. Preferably the material selected can be written on with a grease pencil for the reason to be described, and yet permit the grease to be entirely removed without blemish or damage to the surface of the material. It is also desired that the material be stiff, but need not be rigid.

The disk 11 is a front disk bearing a schematic map of a geographic area having a radius of preferably 250 miles. In this preferred embodiment of the invention, the device 10 is for military use of United States Air Force F-105 pilots stationed at McConnell Air Force Base on the southeast edge of Wichita, Kansas. Accordingly, the center of the map is Wichita, Kansas as indicated by the position of the rivet 14. As best seen in FIG. 1, there are shown on the map, twelve air bases in the states of Kansas, Oklahoma, Texas, Nebraska, and Missouri. Part of the state of Arkansas is shown on the circular map, but no air bases are shown on the Arkansas portion of the map.

A mere glance at the front disk 11 gives a pilot a birdseye view of the area in which he is flying. Accordingly, a navigational change of destination or course can be calculated quickly and accurately. The aircraft can therefore be diverted to another base without unnecessary delay. Supersonic aircraft have only a limited supply of fuel, and therefore a critical maximum flying time. Hence, time is of the essence when flight time and fuel are running out, and the aircraft must be set down at the closest available air base from the air base from which the pilot has been diverted. The reasons for diverting an aircraft may be due to poor landing weather, dangerous runway conditions, air traffic congestion, and/or other reasons.

The front disk 11 bears on its face in the upper left hand portion thereof, a copy of the Morse code shown by the indicia 15. This serves as a reminder for pilots for use in their radio communications with the ground.

The front disk 11 in cooperation with the middle disk 12, provides a circular slide rule computer or calculator for multiplying and dividing time and distance. This computer is especially useful for computing ground speed, available fuel supply, and flying time that may be left.

More particularly, an outer periphery of the front disk 11 is provided with a logarithmic time scale 16 in minutes. The scale 16 is scaled from 0 to 90 minutes. Another or second logarithmic time scale 17 is in hours, and is scaled from 60 minutes on the first scale 16 to 2.00 hours on the second scale 17 concentric with an arcuate portion of the first scale 16.

The middle disk 12 is provided with a distance scale 18 in nautical miles, which is a logarithmic scale similar to the scales 16 and 17. In trigonometry, two numbers can be multiplied by adding the logarithms of the two numbers. Conversely, two numbers can be divided by subtracting the logarithms of the two numbers. Accordingly, the scales 16 and 17 can be used in cooperation or conjunction with the scale 18 for multiplying and dividing, and thus operate as a circular slide rule of the simplest form.

As a convenience, a conversion scale 20 is provided on the scale 18, FIG. 1, for converting nautical miles to statute miles. A nautical mile is 6,000 feet, and a statute mile is 5,280 feet. For example, one statute mile equals 0.88 or approximately nine-tenths of a nautical mile. Therefore, the scale 20 shows an inclusion of nine increments to indicate that a statute mile is approximately nine-tenths of a nautical mile. 11.

An additional feature of the map on the front disk 11 is the provision of a true and magnetic north direction indicator 21. In this central area of the United States, magnetic north is east of true north. The direction indicator 21 is useful in conjunction with the proper orientation of the map and the runway patterns shown on the map for each air base. The map is marked "-Scale: None" because of possible distortion in the manufacture of the navigational aid device 10.

Figure 2:
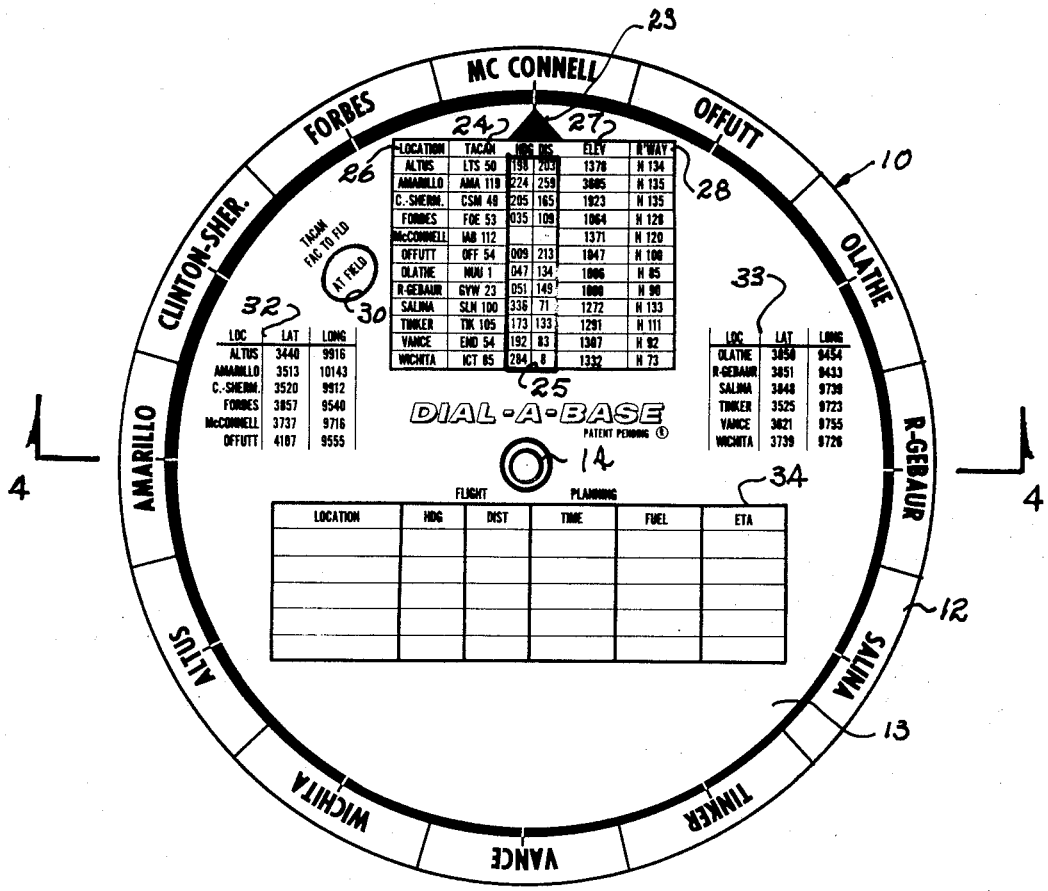
FIG. 2 is a plan view of the back or reverse side of the device shown in FIG. 1.

Referring to FIG. 2, the disk 13 is shown as a back disk on the back or reverse side of the device 10. The back disk 13 can be dialed or turned on the rivet 14 relative to the middle disk 12 for the purpose of obtaining quick and ready reference to the distance and heading; and from one air base to any of eleven other air bases that are listed on disks 12 and 13, and shown or located on the disk !11. For example, the dialable disk 13 is FIG. 2 has an arrow type indicator indicia 23 printed thereon that is shown in FIG. 2 set on MC CONNELL on the periphery of the back side of the middle disk 12.

As best seen in FIG. 2, the dialable disk 13 may be dialed or turned to be set on eleven other air bases on the periphery of the middle disk 13. Reading clockwise from MC CONNELL, the bases are listed on the periphery of the backside of the middle disk 12 through identification indicia, as follows: OFFUTT, OLATHE, R-GEBAUR, SALINA, TINKER, VANCE, WICHITA, ALTUS, AMARILLO, CLINTON-SHER., and FORBES.

As best seen in FIG. 3, the heading and distance from Mc Connell to each of the other eleven air bases are shown tabulated or listed radially from the center of the middle disk 12 to the periphery thereof. Similarly, the headings and distances from OFFUTT, OLATHE, R-GEBAUR, SALINA, TINKER, VANCE, WICHITA, ALTUS, AMARILLO, CLINTON-SHER., FORBES, and MC CONNELL air bases to each of the other eleven air bases are shown tabulated radially from the center of the backside of the middle disk 12 to the periphery thereof, respectively. Each of the heading and distance tabulations are angularly spaced 30°, apart since there are twelve equally spaced air bases listed on the periphery of the middle disk 12.

It will be noted that each of the tabulations merely shows a dot for the heading and distance from the air base listed on the periphery since the heading and distance is theoretically zero thereat.

FIG. 3 also shows the TACAN facility to the field or air base on the left hand side or counterclockwise from the air base listed on the periphery of the middle disk 12. For example, the TACAN facility for OFFUTT, OLATHE, TINKER, WICHITA, Wichita AMARILLO, CLINTON-SHER., and FORBES air bases are indicated as located at the field. In contradistinction thereto, the TACAN facility for the MC CONNELL air base is indicated as being located 2.1 nautical miles, NM, at a heading of 120° from the field. At R-GEBAUR air base, the TACAN facility is indicated as being located 4.2 nautical miles, NM, at 183° from the field. AT SALINA air base the TACAN facility in indicated as being located 1.1 nautical miles, NM, at a heading of 358° from the field. At VANCE air base, the TACAN facility in indicated as being located 4.3 nautical miles, NM, at a heading of 162° from the field. At ALTUS air base, the TACAN facility is indicated as being located 4.5 nautical miles, NM, at a heading of 210° from the field, FIG. 3.

Heading may be defined as a direction in which a ship, aircraft, or other mobile object is pointed with reference to a true, magnetic, compass, or grid north. In this specification, heading is used with reference to true north. An Automatic Direction Finder, ADF, is usually set to indicate true north, but is calibrated or adjusted for any magnetic variation.

Operationally, TACAN is a general term covering the ultrahigh frequency, UHF, omnidirectional heading or bearing and distance type of facility without regard to the fact that the power, the frequency protected service volume, the equipment configuration and operational requirements may vary between facilities at different locations. Accordingly, each of the TACAN facilities at each of the twelve air bases are identified and listed in tabular form by indicia 24 on the back disk 13 just to the left of a rectangular, radially directed heading and distance window 25. The heading and distance window 25 is formed in the disk 13 to coincide with each of the heading and distance tabulations indicia on the disk 12 beneath the disk 13. TACAN means Tactical Air Navigation.

The twelve air bases are listed in tabular form by identification indicia 26 just to the left of and contiguous with the TACAN table 24. The elevation, in feet above sea level, of each of the air bases are listed in tabular form as by elevational indicia 27 and contiguous with a right hand radial edge of the heading and distance window 25. The runway heading and bearing of the main runway at each of the twelve air bases are listed in tabular form by runway condition and heading indicia 28 on the right hand side of and contiguous with the elevation table indicia 27. The letter "H" with the runway condition and heading indicia 28 is a universal well known aeronautical symbol meaning "hard surface" runway.

The tables of indicia 24, 26, 27, and 28, in conjunction with the window 25, together form a rectangle on the back disk 13 known collectively as a flight information chart means.

An oval TACAN window or opening 30 is formed to the left of the table 26 at an angle of approximately thirty degrees, 30°, from the radial center line of the window 25, to permit the viewing of the TACAN locations indicia of each of the twelve air bases.

Another feature of the invention is the provision of tables with coordinate indicia 32 and 33, FIG. 2, of the latitude and longitude coordinates of each of the twelve air bases. The table 32 provides the latitude and longitude coordinates of the ALTUS, AMARILLO, C-SHERM., FORBES, McCONNELL, and OFFUTT air bases on the upper left hand side of the back disk 13. The table coordinate indicia 33 provides the latitude and longitude coordinates of the OLATHE, R-GEBAUR, SALINA, TINKER, VANCE, and WICHITA air bases on the upper right hand side of the back disk 13 just opposite to the table 32, and above the rivet 14.

Still another feature of this invention is the provision of a flight planning schedule or chart indicia 34 suitable for entering flight plan information comprising location, heading, distance, time, fuel, and estimated time of arrival, ETA. There are five lines provided in the chart 34 for making five different entries for five different destinations and/or legs of a flight. The chart 34 is located below the rivet 14, and is of a rectangular configuration centered beneath the rivet 14 parallel to the charts 32, 33, and 25, 26, 27, 28, which comprise the three charts above the rivet 14.

OPERATION

It is not unusual among pilots to arrive at their destination and find the field not available for landing due to weather, visibility, dangerous runway conditions, and other reasons. Moreover, flight plan alternates that were filed prior to the flight are not usable for one or more of the same reasons. Accordingly, pilots with one eye on the gauges usually reach for the flight manuals hoping to select a new destination before their fuel indicators force the practicing of an emergency landing, or a bailout in extreme situations. At his point wasted time can place the pilot and aircraft in a critical situation.

It is at this time that the device 10 of this invention is brought into use. The user dials the back disk 13 so that the pointer or arrow 23 is moved to the aircraft's present position, such as MC CONNELL in FIG. 2. This permits the pilot to read the distance, heading, elevation, TACAN, and runway heading for eleven alternate air bases. On the front side of the device 10 is the time and distance computer 16, 18, and the map on the disk 11 showing the six state area. By way of example, if the pilot is over TINKER air base in Oklahoma, with 30 knot winds from 250°, and the weatherman radios that AMARILLO and FORBES air bases are open, the pilot may set his course at 013° for most favorable winds, and pick up the FORBES TACAN on channel 53. A spin of the dial 13 to FORBES, FIG. 2, and the oval window 30 reveals that the base's TACAN facility is located at the field.

Although the navigational aid device 10 is not intended to replace conventional flight planning, it is a valuable tool for a pilot whether it be in an emergency or whether the pilot uses the device during conventional flight planning periods.

Figure 5:
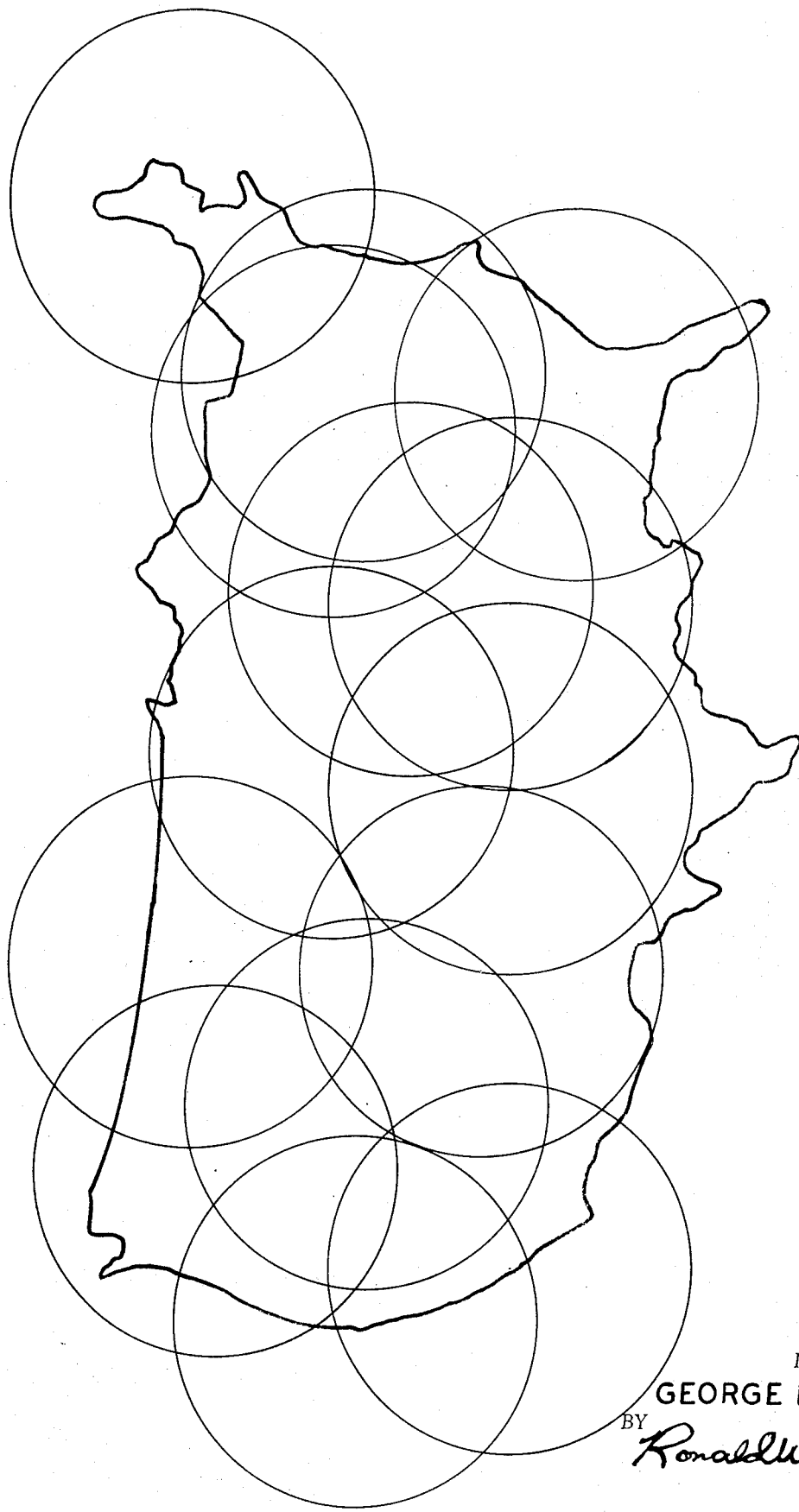
FIG. 5 is a schematic outline of the continental United States of America showing overlapping circular areas for preferably fourteen different overlapping circular area embodiments of the air navigational aid device of this invention.

Referring to FIG. 5, a schematic outline of the continental United States is shown with fourteen overlapping circles representing fourteen overlapping circular areas of the United States that could be depicted on the front disk 11 of the device 10. However it will be understood that any geographical area of the world to any scale and/or dimension may be depicted on the disk 11 of the device 10. Moreover, it is contemplated that a plethora of the devices 10 may be made available for use as the aircraft traverses the various geographical areas, and from one area to another, so that a device is available for all geographic areas.

Additionally, although the device 10 is shown to be adapted especially for use by military pilots of fighter type aircraft, the device 10 can be adapted for use by civil aircraft, both commercial and noncommercial. In the case of a small noncommercial aircraft used by most civilian pilots, only the air parks and air ports that could be used by that type of aircraft would be shown and described on the device 10. In this instance, the TACAN and latitude-longitude coordinates would be largely superfluous. However, the map would continue to show the restricted areas usually banned to light plane pilots, in its preferred form. In lieu of the TACAN chart, the chart would provide the radio channel for each of the air parks and air ports listed.

It will be understood that the present invention may be modified to adapt it to various circumstances and conditions, and it is accordingly desired to comprehend within the purview of this invention such modifications as may be considered to fall within the scope of the appended claims.

What is claimed, is:

1. A navigation aid, comprising;
   a. first means,
   b. second means pivotally connected to said first means,
   c. said second means extended beyond the perimeter of said first means and having identifying indicia on said extended portion to identify a plurality of air bases,
   d. a plurality of heading and distance table indicia on said second means underlying said first means, each associated with a respective one of said identifying indicia,
   e. a flight information chart means on said first means having air base identification indicia adjacent said heading and distance table indicia, and
   f. first window means formed in said first means for viewing therethrough successively, each of said heading and distance table indicia as said first means is angularly indexed relative to said second means with said identifying indicia and said identification indicia cooperating to indicate heading and distance from an air base on said extended portion on said second means to all of the air bases on said identification indicia.

2. A navigation aid as described in claim 1, including;
   a. said first window means having a shape that coincides with the shape of respective ones of said heading and distance indicia, and
   b. said flight information chart means having said identifying indicia for said air bases associated with respective TACAN calls and channel indicia, elevational indicia, and said heading and distance indicia.

3. A navigation aid, comprising;
   a. a first means having indicator indicia thereon,
   b. second means pivotally connected to said first means,
   c. said second means extended outwardly of the perimeter of said first means, said extended portion having identification indicia thereon to identify respective ones of a plurality of air bases,
   d. spaced radio beacon location indicia on said second means for respective ones of said air bases, and
   e. first window means in said first means for viewing therethrough said location indicia of respective ones of the air bases when said indicator indicia is aligned with said identification indicia of respective air bases.

4. A navigation aid as set forth in claim 3, including:
   a. first table means formed on said first means showing latitude and longitude coordinate indicia for each of said identification indicia referring to the subject air bases, and
   b. flight information chart means formed on said first means indicating air base identification indicia and respective TACAN calls and channel indicia, runway elevation indicia, and runway heading indicia for each of the air bases.

5. A navigation aid as set forth in claim 4, including;
   a. a plurality of heading and distance table indicia on said second means to indicate heading and distance from respective ones of said identification indicia of the air bases when said indicator indicia is aligned therewith, and
   b. second window means formed in said first means to view respective ones of said heading and distance table indicia when said first means is angularly indexed to align said indirector means with respective air bases shown by said identification indicia.

6. A navigation aid as set forth in claim 4, including;

a. third means pivotally connected to said second means on the opposite side to which said first means is connected,
b. map indicia formed on said third means locating the plurality of said air bases thereon,
c. said map indicia depicting runway configuration and directional orientation of each of said air bases thereon, and
d. Morse code indicia formed on said third means operable to identify the TACAN call and channels over radio transmission as the radio beacon will be continuously identified by letters in Morse code.

7. A navigation aid as set forth in claim 6, including;
a. said map indicia having area indicia showing restrictive areas where overflight is forbidden, and
b. said second means extends outwardly of said third means, each having on respective outer perimeters to form a circular slide rule to form a time distance computer.

8. A navigation aid, comprising;
a. first means,
b. second means pivotally connected to said first means,
c. first table means formed on said first means showing the latitude and longitude coordinate indicia of each of a plurality of air bases,
d. flight information chart means formed on said first means,
e. said information chart means having stacked, identification indicia for said air bases associated with respective TACAN call and channel indicia, elevational indicia, and running condition and heading indicia,
f. said first means having an opening associated with said information chart means,
g. said second means having distance and heading indicia placed on rotation of said first means into cooperating arrangement with said opening in said first means, and
h. intelligence indicia on said second means identifying respective ones of said air bases alignable with said opening to indicate heading and distance from the other ones of said air bases on reading said heading and distance indicia.

9. A navigation aid as set forth in claim 8, wherein;
a. said intelligence indicia formed in a circle on said second means beyond the perimeter of said first means and identifying each of said plurality of air bases in equiangular spaced apart relationship and in the same order in a clockwise direction as on said information chart means.

10. A navigation aid as set forth in claim 8, including;
a. said opening in said first means located between said TACAN call and channel indicia and said elevation indicia whereby said air base identification indicia, said TACAN call and channel indicia, said distance and heading indicia; and elevation indicia and said runway condition and heading indicia of each of said plurality of air bases can be read in substantially a single line across said information chart means on said first means and said second means, and
b. indicator indicia is formed on said first means to indicate respective ones of said air bases shown by identifying indicia on said second means from which said heading and distance indicia is provided.

* * * * *